United States Patent
Smirra

(10) Patent No.: US 8,602,247 B2
(45) Date of Patent: Dec. 10, 2013

(54) FLUID CONTAINER FOR A MOTOR VEHICLE

(75) Inventor: Karl Smirra, Wasserburg (DE)

(73) Assignee: Emitec Gesellschaft für Emissionstechnologie mbH, Lohmar (DE)

(*) Notice: Subject to any disclaimer, the term of this patent is extended or adjusted under 35 U.S.C. 154(b) by 0 days.

(21) Appl. No.: 13/132,774

(22) PCT Filed: Dec. 3, 2009

(86) PCT No.: PCT/EP2009/066353
§ 371 (c)(1),
(2), (4) Date: Aug. 16, 2011

(87) PCT Pub. No.: WO2010/063801
PCT Pub. Date: Jun. 10, 2010

(65) Prior Publication Data
US 2011/0303689 A1    Dec. 15, 2011

(30) Foreign Application Priority Data

Dec. 3, 2008   (DE) .................... 10 2008 060 121

(51) Int. Cl.
*B65D 25/02* (2006.01)
(52) U.S. Cl.
USPC ............................ 220/563; 220/562; 137/590
(58) Field of Classification Search
USPC ........... 220/562, 563, 501, 734; 137/574, 590
See application file for complete search history.

(56) References Cited

U.S. PATENT DOCUMENTS

| 2,806,622 | A | * | 9/1957 | Leirer | 220/4.14 |
| 3,701,540 | A | * | 10/1972 | Pringle | 280/834 |
| 4,077,884 | A | * | 3/1978 | Naumann | 210/172.3 |
| 4,179,036 | A | | 12/1979 | Pasini | |
| 4,526,286 | A | | 7/1985 | Jüng et al. | |
| 5,176,161 | A | * | 1/1993 | Peters et al. | 137/15.08 |
| 5,918,760 | A | * | 7/1999 | Frodin et al. | 220/661 |
| 6,220,283 | B1 | * | 4/2001 | Saarinen et al. | 137/550 |
| 7,507,131 | B2 | * | 3/2009 | Schaefer, Jr. | 440/88 F |
| 2006/0032538 | A1 | * | 2/2006 | Park | 137/590 |

FOREIGN PATENT DOCUMENTS

| DE | 24 56 525 A1 | 8/1976 |
| DE | 2456525 | 8/1976 |
| DE | 26 23 146 A1 | 12/1977 |
| DE | 28 30 443 A1 | 2/1979 |
| DE | 2830443 | 2/1979 |
| DE | 32 05 592 A1 | 8/1983 |
| DE | 100 41 678 A1 | 3/2002 |
| DE | 10041678 | 3/2002 |
| JP | 4-118818 U | 10/1992 |

* cited by examiner

*Primary Examiner* — Steven A. Reynolds
*Assistant Examiner* — Ernesto Grano
(74) *Attorney, Agent, or Firm* — Cozen O'Connor

(57) ABSTRACT

A collection device with a collection container and a plurality of conducting elements guided on the collection container is disposed in a fluid container for a motor vehicle. The conducting elements are preferably of one-piece construction together with a collection plate surrounding the collection container. Fluid that sloshes around in the fluid container is fed through the conducting elements and the collection plate to the collection container. This allows the minimum amount of fluid in the fluid container required for the proper operation of the motor vehicle to be kept particularly low.

11 Claims, 3 Drawing Sheets

FLUID CONTAINER FOR A MOTOR VEHICLE

PRIORITY CLAIM

This is a U.S. national stage of Application No. PCT/EP2009/066353, filed on Dec. 3, 2009, which claims priority to German Application No: 10 2008 060 121.7, filed: Dec. 3, 2008, the contents of which are incorporated herein by reference.

BACKGROUND OF THE INVENTION

1. Field of the Invention

The invention relates to a fluid container for a motor vehicle having a collection device and a collection container for collecting fluid, wherein the collection device projects above the floor of the fluid container.

2. Related Art

Such fluid containers are known and frequently used in contemporary motor vehicles, in particular for storing fuel, urea, or window washing fluid. A fluid container embodied as a fuel container is known from practice, said fluid container having one or more suction jet pumps arranged at various locations and which draw in fuel from the various locations of the fluid container and feed it to a fuel feeding unit. The suction jet pumps are supplied with fuel as a propellant by the fuel feeding unit. This is intended to ensure, even in the case of a virtually empty fuel container, that sufficient fuel is available for the fuel feeding unit at any time. The arrangement of the collection device above the floor of the fuel container permits the level configuration of the floor of the fuel container. This avoids the formation of a bulge in the fuel container to collect the fuel, which is also possible. As a result, the fuel container can be made flat and can be used in the motor vehicle even under tightly limited spatial conditions.

It is disadvantageous with the known fluid container that the arrangement of a plurality of suction jet pumps distributed in the fluid container requires a large expenditure on mounting. A plurality of suction jet pumps is, however, necessary in such fluid containers since when the motor vehicle is inclined the fluid can run off to one side. Furthermore, as a result the collection device has a very complex design and is therefore susceptible to faults.

SUMMARY OF THE INVENTION

The invention is based on developing a fluid container of the type mentioned at the beginning such that even when there is a small residual quantity of fluid, the fluid container ensures a reliable filling of the collection container and is of particularly simple design.

This problem is solved according to one embodiment of the invention in that the collection device has a plurality of guiding elements arranged in the interior of the fluid container, and in that the guiding elements extend from a region at a distance from the collection container to the collection container.

It is preferred that at least one of the guiding elements is unmovable in the interior of the fluid container, wherein, if appropriate, all the guiding elements can be arranged in an unmovable fashion in the interior of the fluid container.

If appropriate, parts of the guiding elements or additional elements of the collection device can be movable, such as for example nonreturn valves and the like.

The "guided" arrangement of the guiding elements results, in particular, from their profile, which are preferably uninterrupted, from a region at a distance from the collection container to the collection container.

As a result of this configuration, fluid that sloshes around in the interior of the fluid container according to one embodiment of the invention hits against the guiding elements. The guiding elements then guide the fluid into the collection container.

According to one embodiment of the invention, acceleration forces, deceleration forces, and forces resulting from changes in direction that act on the fluid feed the fluid to the collection container. Since, during the operation of the motor vehicle, forces continuously act on the fluid located in the interior of the fluid container, the fluid container according to the invention also permits small residual quantities to be collected in the collection container. The fluid can then be removed from the collection container. As a result, the collection device does not require any extraneous energy or control devices for filling the collection container. The collection device is additionally maintenance-free by virtue of the (preferably) fixed components.

The collection device can be arranged at virtually any desired locations in the fluid container according to one embodiment of the invention if the collection device has a collection plate surrounding the collection container and if the guiding elements are arranged on the collection plate.

The at least one collection container can be a separate (if appropriate retrofittable) component or a component which is integral with the collection container (in particular with the floor).

According to one embodiment of the invention, a contribution is made to the simplification of the guiding of the fluid into the collection container if the collection plate is arranged above a floor of the fluid container and has openings. Fluid that sloshes around on the floor of the fluid container passes through the openings onto the upper side of the collection plate and is fed there to the collection container by the guiding elements. In order to avoid fluid flowing back through the openings, nonreturn valves can be used.

The fluid which is located on the upper side of the collection plate can easily be prevented from running off if an upright edge is arranged on the circumference of the collection plate. The upright edge prevents rapid sloshing of the fluid and can optionally be embodied in one piece with the collection plate or as a wall of the fluid container.

Even in fluid containers with a level floor, the collection device permits the fluid to be guided into the collection container if the collection plate is higher at its side facing the collection container than at its side facing the openings. This allows the collection device to be used even in particularly low fluid containers.

According to one embodiment of the invention, further simplification of the design of the collection device is achieved if the collection plate is configured in the shape of a truncated cone, dropping away toward the edge, and has the collection container in the center.

The collection container could, for example, be arranged on one side of the fluid container. However, according to another advantageous development of the invention the guiding elements can be made particularly short if the guiding elements are made to extend away from the collection container in the shape of a star. The greater the number of guiding elements, the more movement energy of the fluid can be used for feeding it into the collection container.

According to one embodiment of the invention, the collection device is configured in a structurally simple way if the collection container is embodied as a depression in the collection plate.

According to one embodiment of the invention, fabrication costs for the collection device can be kept particularly low if the collection container, the collection plate, and the guiding elements are fabricated in one piece from plastic or metal. As a result, the collection device can additionally be fabricated with very thin walls, with the result that the volume of the fluid container is reduced only to an insignificant degree.

The fluid container according to one embodiment of the invention can be manufactured in a particularly cost-effective way if the collection device is fabricated in one piece with the floor of the fluid container.

Existing fluid containers can easily be retrofitted if the collection device is embodied as an insertion part mounted in the fluid container.

According to one embodiment of the invention, fluid that collects in the collection container can easily be drawn away if a receptacle device for attachment to a pump is arranged in or on the collection container. The pump can be, for example, a fuel feeding unit for feeding fuel to an internal combustion engine. Alternatively, the pump can also be a suction jet pump by which fuel is fed inside the fluid container. The receptacle device preferably secures a suction connector of the pump.

The invention can be applied, in particular, for storing and feeding fuel to an internal combustion engine and/or for storing and feeding a fluid additive (oxidation means, reducing agent, etc.) to a component (catalytic converter, filter, mixer, . . . ) of an exhaust system of an internal combustion engine.

BRIEF DESCRIPTION OF DRAWINGS

The invention permits numerous embodiments. In order to clarify further its basic principle, one thereof is illustrated in the drawings and will be described below. In the drawing.

DETAILED DESCRIPTION OF DRAWINGS

Figure 1:
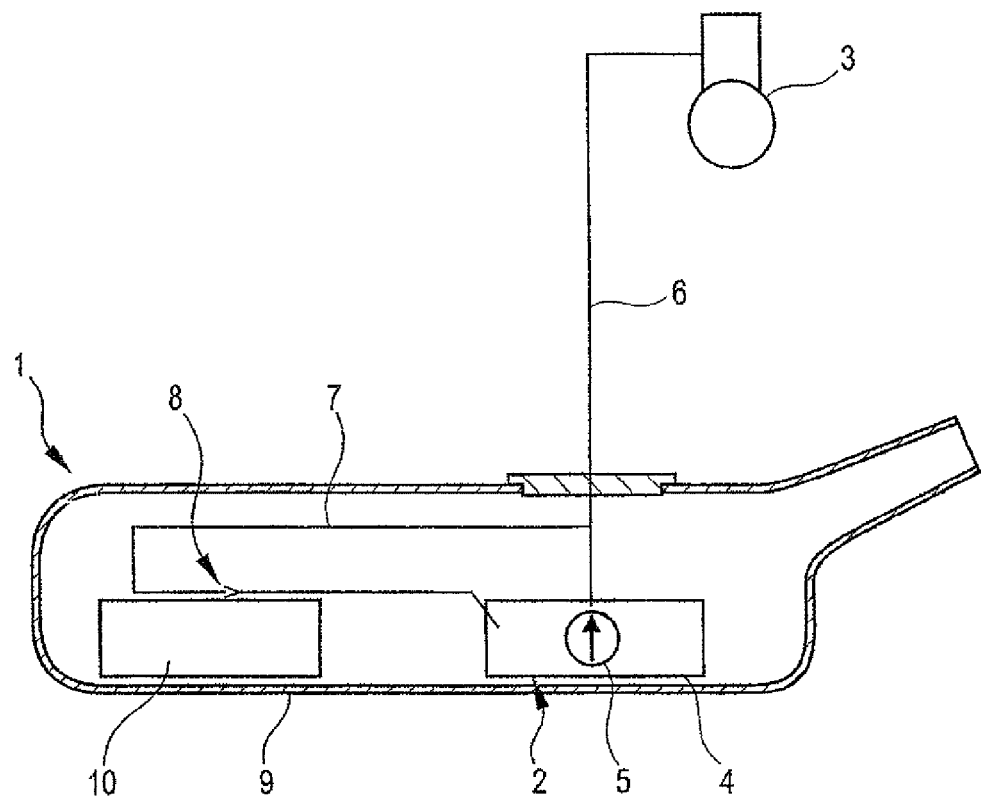
FIG. 1 is a fluid container according to one embodiment of the invention for a motor vehicle in a sectional illustration.

FIG. 1 shows a fluid container 1 for a motor vehicle having a feed unit 2 for feeding a fluid (in particular fuel, urea/water solution, or the like) from the fluid container 1 to a consumer 3 (for example an internal combustion engine, an exhaust system, or the like) of the motor vehicle. The feed unit 2 has a pump 5 arranged in a surge pot 4 connected to the consumer 3 via a flow line 6. A branch 7 leads from the flow line 6 to a suction jet pump 8. The suction jet pump 8 draws the fluid out of a collection device 10 arranged on the floor 9 of the fluid container 1. By way of example for a multiplicity of possible collection devices 10 which are arranged in the fluid container 1, just a single collection device 10 is illustrated in the drawing. The collection device 10 has the function of collecting fluid at a location in the fluid container 1 which is at a distance from the feed unit 2, with the result that said fluid can be drawn in by the suction jet pump 8 and fed to the feed unit 2. The minimum residual quantity of fluid necessary for satisfactory operation of the feed unit 2 in the fluid container 1 is therefore kept as small as possible.

Figure 2:
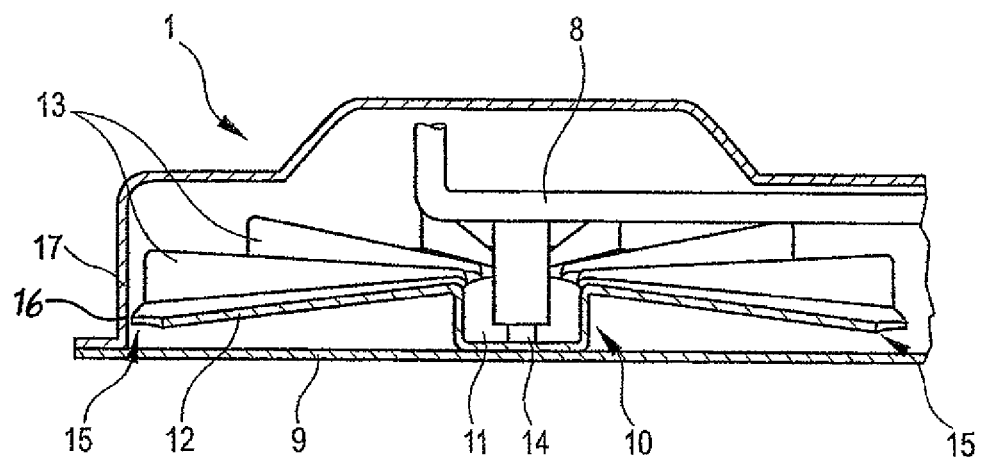
FIG. 2 is an enlarged view of part of the fluid container from FIG. 1 with a collection device.

FIG. 2 shows an enlarged sectional illustration of a part of the fluid container 1 from FIG. 1, which has the collection device 10. It can be seen here that the collection device 10 has a collection container 11 and a collection plate 12 that adjoins the collection container 11. Guiding elements 13, which are located in a star shape from a region at a distance from the collection container 11 to the collection container 11, are arranged on the collection plate 12. The guiding elements 13 are arranged in a star shape around the collection container 11. A receptacle device 14 for the suction jet pump 8 is arranged in the collection container 11. The suction jet pump 8 draws in fluid located in the collection container 11 and feeds said fluid to the feed unit 2 illustrated in FIG. 1. The collection plate 12 is configured in the shape of a truncated cone, dropping away toward the edge. The highest location on the collection plate 12 therefore adjoins the collection container 11. The collection container 11 is embodied as a depression in the collection plate 12. The collection plate 12 has multiple openings 15 at the outer edge. Fluid can flow through the openings 15 from the underside of the collection plate 12 to the upper side and can be fed to the collection container 11 by the guiding elements 13 as a result of the sloshing around. The collection plate 12, the collection container 11 and the guiding elements 13 are fabricated in one piece from plastic. An edge 16 which partially runs around the collection plate 12 is fabricated in one piece with a lateral wall 17 of the fluid container 1. In an alternative embodiment (not illustrated), the edge can also be arranged on the collection container.

Figure 3:
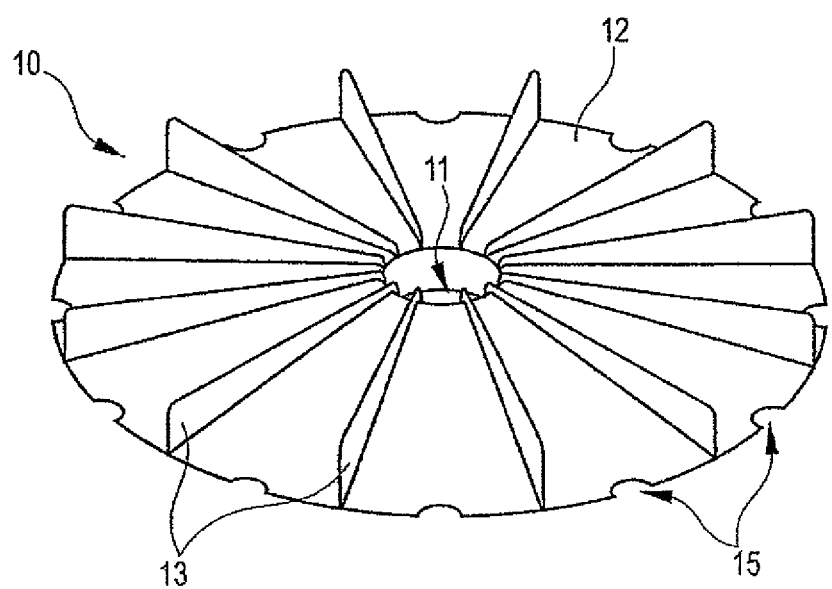
FIG. 3 is a perspective view of part of the collection device from FIG. 2.

FIG. 3 is a perspective view of the collection device 10 with the collection plate 12, the collection container 11 and the guiding elements 13. Here, the radiating-beam-like configuration of the guiding elements 13 which run toward the collection container 11 can be seen particularly clearly. The openings 15 in the collection plate 12 are each arranged between two guiding elements 13.

Figure 4:
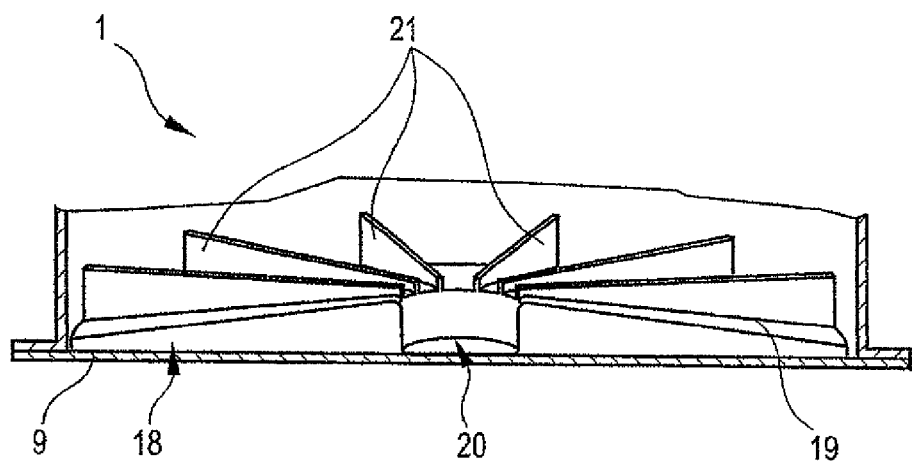
FIG. 4 is a further embodiment of the fluid container.

FIG. 4 shows a further embodiment of the fluid container 1, which differs from that in FIGS. 1 to 3, in that a collection device 18 covers the entire floor 9 of the fluid container 1. The collection device 18 is fabricated from metal using a deep drawing method and has a collection plate 19 with a central, depression-shaped collection container 20. Guiding elements 21 which are arranged on the collection container 20 are formed by a wave shape of the collection plate 19.

Figure 5:
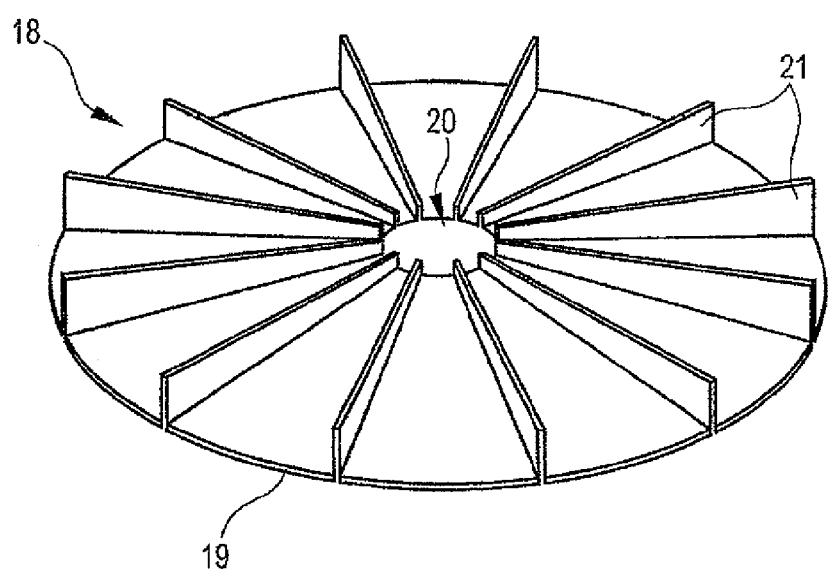
FIG. 5 is a collection device of the fluid container in FIG. 4.

FIG. 5 shows the collection plate 19 with the collection container 20 and the guiding elements 21 from FIG. 4 in a perspective illustration.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A fluid container for a motor vehicle, the fluid container defining an interior floor, the fluid container comprising:
 a collection container for collecting fluid, the collection container having an upper edge projecting above the floor; and
 a collection device projecting above the floor of the fluid container, the collection device comprising:
  a collection plate at least partially above the floor, the collection plate surrounding the collection container, the collection plate having a portion extending from the upper edge of the collection container, the collection plate having an outer circumference, wherein the portion of the collection plate extending from the upper edge is a greater distance from the floor than the outer circumference; and
  a plurality of guiding elements above the floor, on the collection plate, the guiding elements extending from the region to the upper edge of the collection container;
  wherein the collection plate and the guiding elements guide fluid above the collection plate to the edge of the collection container during operation.

2. The fluid container as claimed in claim 1, wherein the collection plate defines openings through the collection plate configured to allow for the passage of fluid from below the collection plate to an upper side of the collection plate.

3. The fluid container as claimed in claim 2, wherein the openings are defined at the outer circumference of the collection plate.

4. The fluid container as claimed in claim 3, wherein the collection plate is configured as a truncated cone having the collection container in a center of the cone and sidewalls dropping away from the edge of the collection container toward the floor.

5. The fluid container as claimed in claim 1, wherein the plural guiding elements extend away from the collection container in a star shape.

6. The fluid container as claimed in claim 1, wherein the collection container is configured as a depression in the collection plate.

7. The fluid container as claimed in claim 1, wherein the collection container, the collection plate, and the plural guiding elements are fabricated in one piece from plastic or metal.

8. The fluid container as claimed in claim 1, wherein the collection device, the collection plate, and the guiding elements are fabricated in one piece with the floor of the fluid container.

9. The fluid container as claimed in claim 1, wherein the collection device is configured as an insertion part that is mounted in the fluid container.

10. The fluid container as claimed in claim 1, further comprising a receptacle device in the collection container, for attachment to a pump.

11. The fluid container as claimed in claim 1, wherein the collection plate is configured as a truncated cone having the collection container in a center of the cone and sidewalls dropping away from the edge of the collection container toward the floor.

* * * * *